United States Patent
Imming

(10) Patent No.: US 7,058,839 B2
(45) Date of Patent: Jun. 6, 2006

(54) CACHED-COUNTER ARRANGEMENT IN WHICH OFF-CHIP COUNTERS ARE UPDATED FROM ON-CHIP COUNTERS

(75) Inventor: Kerry Christopher Imming, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 10/120,876

(22) Filed: Apr. 11, 2002

(65) Prior Publication Data

US 2003/0196131 A1    Oct. 16, 2003

(51) Int. Cl.
*G06F 1/04* (2006.01)
*G06F 1/14* (2006.01)
*H03K 23/00* (2006.01)

(52) U.S. Cl. ................... 713/500; 713/502; 377/44
(58) Field of Classification Search ............. 713/502, 713/500; 377/44, 26, 107, 115, 116, 117
See application file for complete search history.

(56) References Cited

U.S. PATENT DOCUMENTS

| | | | | |
|---|---|---|---|---|
| 3,849,634 A | * | 11/1974 | Saltini et al. ............. 377/26 |
| 4,224,506 A | * | 9/1980 | Coppola et al. ............. 377/32 |
| 4,638,457 A | * | 1/1987 | Schrenk ............. 365/189.01 |
| 4,905,262 A | * | 2/1990 | Eby ............. 377/44 |
| 5,181,231 A | * | 1/1993 | Parikh et al. ............. 377/26 |
| 5,966,144 A | * | 10/1999 | Edwards ............. 347/7 |
| 6,222,900 B1 | * | 4/2001 | Hara ............. 377/107 |
| 6,449,214 B1 | * | 9/2002 | Carr et al. ............. 365/236 |
| 6,678,712 B1 | * | 1/2004 | McLaren et al. ............. 718/100 |
| 6,690,525 B1 | * | 2/2004 | Ruegg et al. ............. 360/51 |
| 6,700,946 B1 | * | 3/2004 | Zarrineh et al. ............. 377/44 |
| 6,836,853 B1 | * | 12/2004 | Dover et al. ............. 713/502 |

FOREIGN PATENT DOCUMENTS

EP    274045    *    7/1988

* cited by examiner

*Primary Examiner*—Thomas Lee
*Assistant Examiner*—Ji H. Bae
(74) *Attorney, Agent, or Firm*—Dugan & Dugan

(57) ABSTRACT

In a first aspect, a counter is maintained in main memory, and a corresponding counter having a smaller number of bits is maintained in cache memory. The counter in cache memory is incremented and when a certain count threshold is reached, the corresponding counter in main memory is updated using the cache memory counter value. This arrangement economizes on the use of main memory access bandwidth.

29 Claims, 1 Drawing Sheet

CACHED-COUNTER ARRANGEMENT IN WHICH OFF-CHIP COUNTERS ARE UPDATED FROM ON-CHIP COUNTERS

FIELD OF THE INVENTION

The present invention is concerned with processor-based devices, and is more particularly concerned with maintaining counters in processor-based devices.

BACKGROUND OF THE INVENTION

Software-based counters are well known. For example, a counter may be maintained in a dedicated location in main memory of a processor, and incremented upon the occurrence of each event to be counted. However, if events to be counted occur frequently and/or a considerable number of counters are maintained in main memory, the updating of the counters in the main memory may consume an undue proportion of the bandwidth available for accessing the main memory.

To avoid this problem, it is known to provide cached counters, i.e. counters maintained in a processor's on-board memory. However, if the number of counters to be maintained is considerable, then an excessive amount of the limited on-board memory space may be taken up by the counters.

In another known technique, a counter is maintained in main memory and at times the value of that counter is temporarily stored in cache memory and incremented in cache memory in response to events to be counted. After a period of incrementing the counter value in cache memory, the incremented counter value is stored back in main memory. However, the use of cache memory may be excessive during the times that the counter value is cached.

In network processors the need for and use of counters may be sufficiently intensive that prior art counter arrangements are unsatisfactory. For example, it may be necessary to compile extensive statistics that require much counting. The events to be counted may include receipt and/or dispatch of data frames, or bus utilizations (numbers of commands asserted on a bus). It may even be necessary to count individual bytes received or transmitted.

Particularly in view of the counting requirements of network processors, it would be desirable to provide a counter arrangement that neither requires an excessive quantity of the bandwidth available for accessing main memory nor consumes a large part of on-board memory.

SUMMARY OF THE INVENTION

According to a first aspect of the invention, a method of maintaining a counter in a processing device is provided. The method includes maintaining a first counter in a memory that is on board a processing integrated circuit, and fetching a counter value from a second counter stored in a memory device that is separate from the processing integrated circuit. The method further includes adding a counter value from the first counter to the fetched counter value from the second counter to produce a sum counter value, and writing the sum counter value into the second counter.

A "processing device" should be understood to mean any device that performs data processing or network control processing.

A "processing integrated circuit" should be understood to mean an integrated circuit that performs data processing or network control processing.

A memory is "on board" an integrated circuit if it is formed as part of the integrated circuit.

A memory device is "separate from" an integrated circuit if it is not on board the integrated circuit.

A plurality of first counters may be maintained on board the processing integrated circuit, and a corresponding plurality of second counters may be maintained in the memory device. In at least one embodiment, the respective counter values from the plurality of second counters may be fetched together in a block fetch operation.

According to a second aspect of the invention, another method of maintaining a counter in a processing device is provided. The method includes maintaining a first counter, maintaining a second counter, detecting a trigger event, and in response to the trigger event, updating the second counter based on a counter value of the first counter.

In at least one embodiment, the trigger event may be setting of a high order bit of the first counter or may be a "counter flush" instruction.

The updating of the second counter may include, for example, fetching a counter value from the second counter, and may also include adding respective counter values of the first and second counters. Alternatively, the updating of the second counter may include loading into the second counter the counter value of the first counter.

The first counter may be stored, for example, in a memory that is on board a processing integrated circuit, and the second counter may be stored, for example, in a memory that is not on board the processing integrated circuit.

According to a third aspect of the invention, a method of resetting a counter is provided. The method includes maintaining a first counter, maintaining a second counter, clearing the first counter, and setting a "reset-pending" bit. The method further includes detecting a trigger event, and in response to the trigger event and the "reset-pending" bit, loading into the second counter a counter value of the first counter.

According to a fourth aspect of the invention, a method of maintaining counters in a processing device is provided. The method includes maintaining a plurality of first counters in a memory that is on board a processing integrated circuit, and maintaining a like plurality of second counters in a memory device that is separate from the processing integrated circuit. Each of the second counters is associated with a respective one of the first counters. The method further includes detecting a trigger event with respect to a particular one of the first counters, and in response to the trigger event, updating all of the second counters based on counter values of the first counters respectively associated with the second counters.

Each of the above methods may be implemented in, for example, a processing device that includes a processing integrated circuit including an on-board memory, and a memory device that is separate from, and operatively coupled to, the processing integrated circuit. Numerous other aspects are provided, as are computer program products. Each inventive computer program product may be carried by a medium readable by a computer (e.g., a carrier wave signal, a floppy disk, a hard drive, a random access memory, etc.).

With the counter arrangement of the present invention, bandwidth for accessing main memory is conserved, without unduly burdening on-board memory. Furthermore, the main memory counters may be grouped into a block of counters that are updated in parallel upon the occurrence of a triggering event with regard to any one of the corresponding on-board counters. This further reduces traffic to the main memory.

Other objects, features and advantages of the present invention will become more fully apparent from the following detailed description of exemplary embodiments, the appended claims and the accompanying drawings.

DETAILED DESCRIPTION

An exemplary embodiment of the present invention will now be described with reference to FIGS. 1 and 2.

Figure 1:
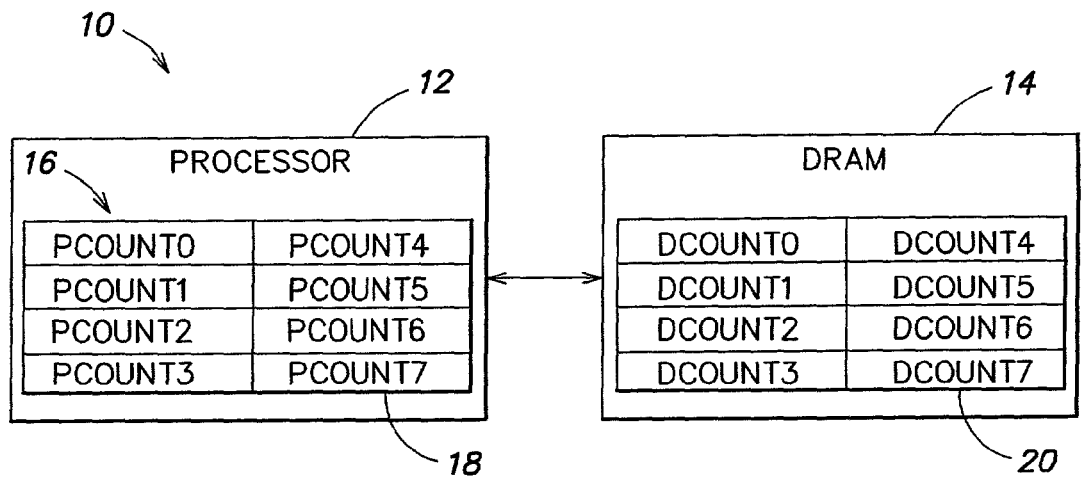
FIG. 1 is a simplified block diagram representation of a processing device in which counters are maintained in accordance with the invention.

FIG. 1 is a simplified block diagram of a processing device 10 provided in accordance with the invention. The processing device 10 includes a processing integrated circuit (IC) 12, which will also sometimes be referred to as a "processor" or a "processor chip". Operatively coupled to the processor chip 12 is a memory device 14, which may, for example, be a dynamic random access memory (DRAM) or other suitable memory. The processor chip 12 includes on-board memory 16 in which, in at least one embodiment, eight counters 18 (indicated as PCOUNT0 through PCOUNT7) are maintained. Other numbers of counters may be similarly maintained. The counters 18 will sometimes be referred to as "on-chip counters". It is to be understood that the on-board memory 16 may be used for purposes in addition to maintaining the on-chip counters 18, and preferably has memory locations in addition to the memory locations taken up by the on-chip counters 18. The on-board memory 16 may, for example, be a fast SRAM (static random access memory) or other suitable memory.

In at least one embodiment, eight counters are maintained in the DRAM 14. The eight counters 20 are indicated as DCOUNT0 through DCOUNT7 and respectively correspond to the on-chip counters PCOUNT0 through PCOUNT7. The counters 20 will sometimes be referred to as "DRAM counters". Other numbers of counters may be maintained in the DRAM 14.

In one embodiment of the invention, the on-chip counters 18 are each eight-bit counters, and the DRAM counters 20 are each 32-bit counters, with each on-chip counter 18 representing the low order eight bits of the corresponding DRAM counter 20. Although only one block of eight DRAM counters 20 is indicated in FIG. 1, it is contemplated to maintain in the DRAM 14 two or more blocks of eight counters each, with a corresponding number of on-chip counters 18 being maintained in the on-board memory 16 of the processor chip 12. It is also contemplated to maintain a number of DRAM counters 20 that is less than eight, or a number of DRAM counters 20 that is greater than eight but is not an integral multiple of eight. In each case, it should be understood that a corresponding number of on-chip counters 18 may be maintained in the on-board memory 16 of the processor chip 12.

Figure 2:
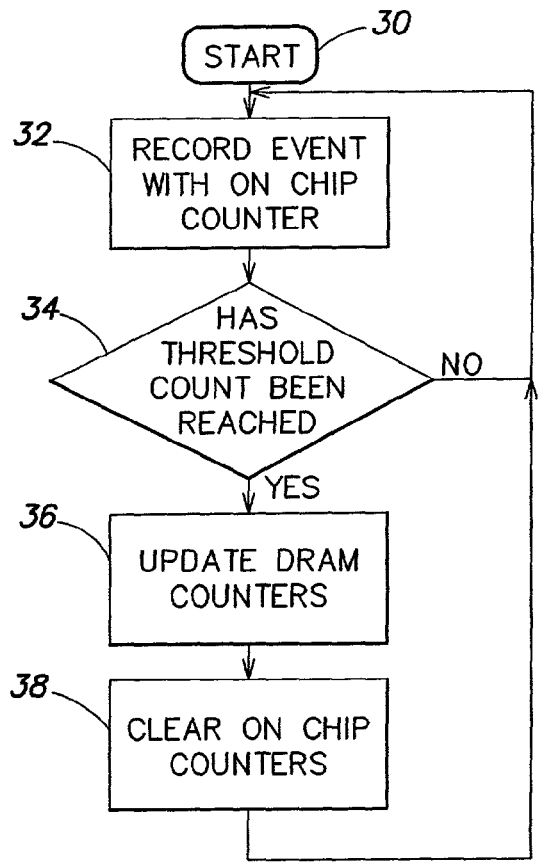
FIG. 2 is a flow chart that illustrates a method of operating the counters shown in FIG. 1.

FIG. 2 is a flow chart that illustrates a method of operating the counters 18 and 20 in accordance with the invention. The process of FIG. 2 starts at 30, and proceeds to block 32. At block 32 an event that is to be counted by a particular one of the on-chip counters 18 is recorded. That is, upon occurrence of the event, the relevant on-chip-counter 18 is incremented. It is then determined, at a decision block 34, whether a threshold count (also referred to as a trigger event) has been reached with regard to the particular on-chip counter 18. For example, a trigger event may be considered to have occurred when the high order bit of the relevant on-chip counter is set (e.g., when the on-chip counter 18 reaches a count of 128, assuming 8-bit on-chip counters). In another embodiment of the invention, a trigger event may be considered to have occurred upon setting of the two high order bits of an on-chip counter (e.g., on a count of 192 if the on-chip counter is eight-bit).

If a negative determination is made at decision block 34, then the process of FIG. 2 loops back to block 32 and the next event to be recorded. However, if a positive determination is made at block 34, i.e. if a trigger event has occurred, then block 36 follows decision block 34. At block 36, each of the eight DRAM counters 20 is updated to reflect the current counter value of the corresponding on-chip counter 18. That is, upon one of the on-chip counters 18 reaching a threshold count, all eight of the DRAM counters 20 are updated in parallel.

In at least one embodiment of the invention, the updating of the DRAM counters 20 may be carried out as follows. A 32-byte block of memory corresponding to the current counter values of the eight DRAM counters 20 is fetched from the DRAM 14. Then the current counter values of the on-chip counters 18 are added to the fetched counter values of the corresponding DRAM counters 20. That is, the value of the on-chip counter PCOUNT0 is added to the fetched value of the DRAM counter DCOUNT0, the value of the on-chip counter PCOUNT1 is added to the fetched value of the DRAM counter DCOUNT1, and so forth. The resulting sums are then stored back into the corresponding DRAM counters 20. Then the on-chip counters 18 are cleared (block 38). After block 38, the process of FIG. 2 loops back to block 32 and further event counting takes place.

During updating of a block of DRAM counters, the additions of the on-chip counter values to the respective DRAM counter values may be performed in parallel or serially. If serial addition is provided for, chip space is conserved, at some cost in performance. If parallel addition is provided for, performance is improved, at the cost of requiring more chip area.

It will be appreciated that in the embodiment described above, the actual value of the counter corresponding to a DRAM counter 20 and its corresponding on-chip counter 18 is the sum of the 32-bit DRAM counter 20 and the eight-bit on-chip counter 18. If it is desired to determine the current count value for any purpose, a "counter flush" instruction may be asserted. The counter flush instruction may be issued in the processor 12 by software which controls operation of the processor 12. The counter flush instruction is taken to be a trigger event which causes updating of the block of DRAM counters 20. Correct counts are then available in the DRAM counters 20.

If it is necessary to reset one of the inventive counters, the corresponding on-chip counter 18 may be cleared and a "reset-pending" bit may be set for that counter. Then, on the next occasion when the corresponding DRAM counter 20 is to be updated, the set condition of the "reset-pending" bit is detected, and the current value of the on-chip counter 18 is loaded into the corresponding DRAM counter 20, instead of adding the two counter values and loading the sum into the DRAM counter 20. Of course, upon the loading of the on-chip counter value into the DRAM counter, the pertinent "reset-pending" bit is cleared. The "reset-pending" bit may be an extra bit associated with each on-chip counter 18 and may be set or cleared as required by suitable instructions contained in the software which controls the processor 12.

In one embodiment of the invention, blocks of counters are assigned so that all of the counters in each block have similar update rates. For example, assuming a whole block of eight counters is updated in parallel when one of the counters of the block counts up to 128, assignment of blocks of counters in this fashion may produce an approximately 1000-fold reduction in traffic to the main memory (e.g., DRAM 14 in FIG. 1), as compared to an arrangement in which each event results in an update of a counter maintained in the main memory (8×128=(approx.)1000).

Whether or not counters are grouped as indicated in the preceding paragraph, it will be appreciated that the present invention provides great savings in terms of numbers of accesses to main memory. Furthermore, this is done without setting aside a large quantity of on-board memory. The reduction in main memory traffic also results in reduction in power consumption.

The following procedure may be implemented so that counting can continue during updating of a DRAM counter. Upon initiation of an update, the value of the on-chip counter is temporarily buffered and the on-chip counter is zeroed, making it ready immediately to count more events. The buffered on-chip counter value is then used for the update.

The foregoing description discloses only exemplary embodiments of the invention; modifications of the above disclosed apparatus and methods which fall within the scope of the invention will be readily apparent to those of ordinary skill in the art. For example, the DRAM counters 20 may be other than 32-bit counters, and the on-chip counters 18 may be other than eight-bit counters. The larger the number of bits in the on-chip counters 18, the greater the savings in terms of main memory accesses. However, it should be recognized that increasing the number of bits in the on-chip counters 18 increases the amount of on-board memory 16 used for the counters.

As another example, the number of DRAM counters 20 in each block of counters may be more or less than eight.

Although all of the on-chip counters are described above as having the same number of bits, it is contemplated to provide on-chip counters having different numbers of bits. It may also be the case that not all of DRAM counters have the same number of bits.

It is also contemplated to update the DRAM counters 20 individually, and not in blocks, although as noted above, block updates are advantageous in terms of reducing main memory accesses.

While the present invention is particularly applicable to network processors, it may also be applied in other processor-based devices.

Accordingly, while the present invention has been disclosed in connection with exemplary embodiments thereof, it should be understood that other embodiments may fall within the spirit and scope of the invention, as defined by the following claims.

The invention claimed is:

1. A method of maintaining a counter in a processing device, comprising:
    maintaining a first counter in a memory that is on board a processing integrated circuit;
    fetching a counter value from a second counter stored in a random access memory device that is separate from the processing integrated circuit;
    adding a counter value from the first counter to the fetched counter value from the second counter to produce a sum counter value; and
    writing the sum counter value into the second counter.

2. The method of claim 1, wherein the first counter has a first number of bits and the second counter has a second number of bits larger than the first number of bits.

3. The method of claim 2, wherein the first counter is an eight-bit counter and the second counter is a 32-bit counter.

4. The method of claim 1, wherein a plurality of first counters are maintained on board the processing integrated circuit, and a corresponding plurality of second counters are maintained in the random access memory device.

5. The method of claim 4, wherein respective counter values from the plurality of second counters are fetched together in a block fetch operation.

6. The method of claim 4, wherein the plurality of first counters includes eight first counters, and the plurality of second counters includes eight second counters.

7. The method of claim 1, wherein the random access memory device is a dynamic random access memory (DRAM).

8. A method of maintaining a counter in a processing device, comprising:
    maintaining a first counter on board a processing integrated circuit;
    maintaining a second counter in a random access memory that is separate from the processing integrated circuit;
    detecting a trigger event; and
    in response to the trigger event, updating the second counter based on a counter value of the first counter.

9. The method of claim 8, wherein the trigger event is setting of a high order bit of the first counter.

10. The method of claim 8, wherein the trigger event is a counter flush instruction.

11. The method of claim 8, wherein the updating step includes fetching a counter value from the second counter.

12. The method of claim 8, wherein the updating step includes adding respective counter values of the first and second counters.

13. The method of claim 8, wherein the updating step includes loading into the second counter the counter value of the first counter.

14. The method of claim 8, wherein the first counter has a first number of bits and the second counter has a second number of bits larger than the first number of bits.

15. A method of resetting a counter, comprising:
    maintaining a first counter;
    maintaining a second counter;
    clearing the first counter;
    setting a reset-pending bit;
    detecting a trigger event; and
    in response to the trigger event and the reset-pending bit, loading into the second counter a counter value of the first counter.

16. The method of claim 15, wherein the trigger event is setting of a high order bit of the first counter.

17. The method of claim 15, wherein the trigger event is a counter flush instruction.

18. The method of claim 15, further comprising:
    in conjunction with the loading step, resetting the reset-pending bit.

19. A method of maintaining counters in a processing device, comprising:
    maintaining a plurality of first counters in a memory that is on board a processing integrated circuit;

maintaining a like plurality of second counters in a random access memory device that is separate from the processing integrated circuit, each of the second counters being associated with a respective one of the first counters;

detecting a trigger event with respect to a particular one of the first counters; and in response to the trigger event, updating all of the second counters based on counter values of the first counters respectively associated with the second counters.

20. The method of claim 19, wherein the trigger event is setting of a high order bit of the particular one of the first counters.

21. The method of claim 19, wherein the plurality of first counters includes eight first counters, and the plurality of second counters includes eight second counters.

22. A processing device, comprising:
a processing integrated circuit including an on-board memory; and
a random access memory device that is separate from, and operatively coupled to, the processing integrated circuit;
wherein the processing integrated circuit is programmed to:
maintain a first counter in the on-board memory;
fetch a counter value from a second counter stored in the random access memory device;
add a counter value from the first counter to the fetched counter value from the second counter to produce a sum counter value; and
write the sum counter value into the second counter.

23. A processing device, comprising:
a processing integrated circuit including an on-board memory; and
a random access memory device that is separate from, and operatively coupled to, the processing integrated circuit;
wherein the processing integrated circuit is programmed to:
maintain a first counter in the on-board memory;
maintain a second counter in the random access memory device;
detect a trigger event; and
in response to the trigger event, update the second counter based on a counter value of the first counter.

24. A processing device, comprising:
a processing integrated circuit including an on-board memory; and
a random access memory device that is separate from, and operatively coupled to, the processing integrated circuit;
wherein the processing integrated circuit is programmed to:
maintain a first counter in the on-board memory;
maintain a second counter in the random access memory device;
clear the first counter;
set a reset-pending bit;
detect a trigger event; and
in response to the trigger event and the reset-pending bit, load into the second counter a counter value of the first counter.

25. A processing device, comprising:
a processing integrated circuit including an on-board memory; and
a random access memory device that is separate from, and operatively coupled to, the processing integrated circuit;
wherein the processing integrated circuit is programmed to:
maintain a plurality of first counters in the on-board memory;
maintain a like plurality of second counters in the random access memory device, each of the second counters being associated with a respective one of the first counters;
detect a trigger event with respect to a particular one of the first counters; and
in response to the trigger event, update all of the second counters based on counter values of the first counters respectively associated with the second counters.

26. A computer program product for use with a processing device that includes a processing integrated circuit and a random access memory device operatively coupled to the processing integrated circuit, the processing integrated circuit having an on-board memory, the computer program product comprising:
a medium readable by a computer, the computer readable medium having computer program code adapted to:
maintain a first counter in the on-board memory;
fetch a counter value from a second counter stored in the random access memory device;
add a counter value from the first counter to the fetched counter value from the second counter to produce a sum counter value; and
write the sum counter value into the second counter.

27. A computer program product for use with a processing device that includes a processing integrated circuit and a random access memory device operatively coupled to the processing integrated circuit, the processing integrated circuit having an on-board memory, the computer program product comprising:
a medium readable by a computer, the computer readable medium having computer program code adapted to:
maintain a first counter in the on-board memory;
maintain a second counter in the random access memory device;
detect a trigger event; and
in response to the trigger event, update the second counter based on a counter value of the first counter.

28. A computer program product for use with a processing device that includes a processing integrated circuit and a random access memory device operatively coupled to the processing integrated circuit, the processing integrated circuit having an on-board memory, the computer program product comprising:
a medium readable by a computer, the computer readable medium having computer program code adapted to:
maintain a first counter in the on-board memory;
maintain a second counter in the random access memory device;
clear the first counter;
set a reset-pending bit;
detect a trigger event; and
in response to the trigger event and the reset-pending bit, load into the second counter a counter value of the first counter.

29. A computer program product for use with a processing device that includes a processing integrated circuit and a random access memory device operatively coupled to the processing integrated circuit, the processing integrated circuit having an on-board memory, the computer program product comprising:
  a medium readable by a computer, the computer readable medium having computer program code adapted to:
    maintain a plurality of first counters in the on-board memory;
    maintain a like plurality of second counters in the random access memory device, each of the second counters being associated with a respective one of the first counters;
    detect a trigger event with respect to a particular one of the first counters; and
    in response to the trigger event, update all of the second counters based on counter values of the first counters respectively associated with the second counters.

* * * * *